United States Patent Office 2,758,096
Patented Aug. 7, 1956

2,758,096

ALKALI METAL DISPERSIONS

Eugene F. Hill, Detroit, Mich., assignor to Ethyl Corporation, New York, N. Y., a corporation of Delaware No Drawing. Application February 21, 1952,
Serial No. 272,910

3 Claims. (Cl. 252—309)

The present invention relates to alkali metal dispersions and is particularly concerned with dispersions of metallic sodium in inert liquid mediums.

The alkali metals, such as sodium and potassium, which have long been known in the chemical art for their highly reactive nature find widespread application as reducing agents, polymerization catalysts, condensation catalysts and the like. Their use, however, has been limited by the fact that these metals have previously been available generally in massive or lump form, and therefore, because of the relatively small surface area available for reaction, reaction rates have been so slow in many applications as to render the processes unattractive commercially. Also, when the metals are in this form they are somewhat difficult to handle. Consequently there have been continued attempts to present the alkali metals in a more reactive form, and in a form which would render them more easy to manipulate and handle. One such advance in the art was made with the development of so-called "sodium sands." This material is prepared by agitating metallic sodium in the presence of a liquid so as to break the metal up into coarse particles. While the particle size achieved in this material was of the order of 500 to 3000 microns, the metallic particles displayed a strong tendency to settle and agglomerate thus rendering the material of limited utility. More recently, however, dispersions of the alkali metals, and in particular sodium dispersions, have been developed. These dispersions are prepared by fusing the alkali metal in an inert liquid and subjecting the entire mixture to vigorous agitation while maintaining a temperature at which the alkali metal is in the molten state. This results in a suspension of finely divided particles of alkali metal, and the particle size achieved by this method can be of the order of 5 to 10 microns or even less, thus representing a substantial improvement over the sodium sands. These dispersions thus find application in many chemical reactions which were heretofore too slow to be practical with massive sodium, for example, or even sodium sand.

It has been recognized, however, that these dispersions can be improved by incorporating therein a small amount of a dispersing agent, the dispersing agent serving to enhance the formation of particles of uniform size and also to prevent the metal from settling, thereby permitting the material to be stored for prolonged periods. It has been proposed to utilize fatty acid soaps as dispersing agents, particularly in the preparation of sodium dispersions. While such use has permitted the formation of good quality dispersions which show little tendency to settle, the use of soaps is subject to some disadvantage. For example, sodium dispersions are found useful in many reduction reactions which are followed by hydrolysis steps. When such is the case the presence of the soap tends to cause emulsion formation upon hydrolysis, thereby complicating the recovery of the final product.

It is therefore an object of this invention to overcome the disadvantages of the prior art, and provide a new and improved dispersion of alkali metal in an inert medium. A more specific object is to provide an improved dispersion of metallic sodium in inert liquid which is characterized by uniform particle size, and possesses little tendency to settle or agglomerate. A still further object of this invention is to provide a process for preparing these dispersions.

These and other objects of this invention will become apparent as the following description proceeds, and the features of novelty which characterize the invention are pointed out with particularity in the claims annexed to and forming a part of this specification.

The above and other objects of this invention are accomplished by providing an alkali metal dispersion containing a minor amount of activated clay. It has been found that the use of activated clay not only enhances the formation of dispersions of uniform particle size but the resulting dispersions display little tendency to settle or agglomerate. The dispersions prepared in accordance with this invention can therefore be handled easily and stored for prolonged periods without losing their beneficial properties. Furthermore, the presence of activated clay in an alkali metal dispersion is not detrimental to processes using the dispersion where hydrolysis is employed as one of the steps.

Activated clay is a term well known in the art and is used to designate clay materials which have been treated with a mineral acid in a manner so as to enhance the surface activity and adsorbent properties of the clay. The activation is generally accomplished by initially crushing the raw clay and mixing the crushed material with water so as to form a slurry. A mineral acid, such as sulfuric or hydrochloric, is added to this slurry in amount up to about 30 to 40 per cent of the total dry weight of the clay. This mixture is then treated with live steam to a temperature of about 175° F. to 220° F. for a period of about 5 to 6 hours. Following this treatment the mixture is dumped into fresh water and the excess salts and acid removed by repeated washings in a filter press, or by repeated decantation. The wash liquor is then removed by filtration, and the filter cake, comprising the activated clay, is dried and ground.

The adsorbent properties of most raw clays can be enhanced by an acid treatment so as to render them useful in my invention. Especially good results, however, can be obtained using the bentonite clays. Bentonite is a term used to designate earthy, unconsolidated deposits consisting chiefly of montmorillonitic clay minerals which have resulted from the weathering of volcanic ash or tuffs. This material is a hydrated aluminum silicate, and the approximate composition is generally given as $Al_2O_3 \cdot 6SiO_2 \cdot 5H_2O$, although other clay minerals, such as montmorillonite ($Al_2O_3 \cdot 4SiO_2 \cdot 9H_2O$), beidellite ($Al_2O_3 \cdot 3SiO_2 \cdot 3H_2O$) and kaolinite ($Al_2O_3 \cdot 2SiO_2 \cdot 2H_2O$) are usually present. Although activated bentonite is preferred in the present invention good results can also be obtained using other activated clays such as halloysite, newtonite, cimolite, pyrophyllite, allophane, collyrite, and schrotterite or mixtures of two or more of these clays.

The alkali metal dispersions which comprise my invention are prepared, in general, by fusing alkali metal in an inert medium, usually a liquid hydrocarbon, and agitating this mixture while maintaining the temperature sufficiently high so that the alkali metal remains in the molten state. During this agitation or prior thereto a minor amount, generally from about 0.05 to 5 per cent by weight of the total of activated clay is added to the mixture. The agitation is continued until the resulting product is a suspension of finely divided particles of alkali metal in the inert medium. Such particles may have an average size of from about 5 to 10 microns.

As indicated above, the activated clay can be introduced into the mixture during agitation, or it can be added to the inert medium prior to fusing the alkali metal therein. Either method produces equally good results since it is only necessary that the clay be present during at least a portion of the agitation period.

A number of inert mediums have been found suitable for the preparation of these dispersions. In general, it is only necessary that this medium be inert to the alkali metal, although it is preferred that the medium have a boiling point which is above the melting point of the particular alkali metal being dispersed. This latter property is not essential, however, since it is obvious that by employing a pressurized operation dispersions can be prepared in inert mediums which normally boil at temperatures below the fusing point of the metal. Examples of inert mediums which can be used include hydrocarbons such as benzene, toluene, xylene, decalin, tetralin, n-octane, diphenyl, n-nonane, n-decane, n-undecane, cumene, ethyl benzene, heavy alkylate, naphthalene, anthracene and other organic materials such as diphenyl oxide, triphenylamine and the like.

The relative amounts of metal and inert medium employed to form the dispersions are not critical and the concentration of the alkali metal may be varied from trace amounts up to 60 per cent by weight of the total. Metal concentrations of above 60 per cent are feasible, but the resulting dispersion is quite viscous and not as easily handled as dispersions having a lower metal concentration. Generally, dispersions having a metallic concentration of approximately 20 to 50 per cent by weight have been found most useful in industrial applications.

A number of different methods are available by which to accomplish the actual formation of the dispersion, and since all of these methods produce equally good results no one method is preferred over the others. One very simple method, however, comprises the use of a high speed counter-rotating mechanical stirring device. When this method is employed the mixture consisting of the metal, inert medium, and activated clay is subjected to stirrer speeds of from about 10,000 to 15,000 R. P. M. during which time the mixture is maintained at a temperature at which the alkali metal is in the molten state. The resulting particle size is, of course, dependent in part upon the length of stirring time, and it has been found that a period of about from 30 to 45 minutes is sufficient to achieve an average particle size of from about 5 to 10 microns. Another method which has been found well suited for the preparation of dispersions comprises subjecting the mixture of alkali metal, clay and inert medium to the action of a conventional colloid mill. When this method is employed it has been found advantageous to pre-mix the ingredients to some extent so as to accomplish an initial subdivision of the metal. This initial mixture is then fed to the colloid mill where the final agitation is accomplished. One other method which can be mentioned includes the use of a jet pump and baffle plate. In this later case the ingredients are heated to fuse the alkali metal, and the heated mixture is propelled at high speeds by the pump against a rigid baffle plate. The force of impact serves to subdivide the metal and distribute it throughout the inert medium.

The following examples wherein two of the methods for preparing alkali metal dispersions are described will serve to further illustrate the present invention. The proportions of ingredients given are on total weight basis.

Example I

Fifty parts of metallic sodium are introduced into a vessel equipped with a high speed counter-rotating mechanical stirring device. One hundred parts of toluene and two parts of activated bentonite are added to the sodium, and the mixture heated to about 110° C. While maintaining this temperature the entire mixture is agitated with the stirring device operating at a speed of about 12,000 R. P. M. for a period of about 30 to 45 minutes. Upon cooling, the resulting product is a suspension of finely divided particles of metallic sodium uniformly dispersed throughout the toluene and having an average size of from 5 to 10 microns.

Example II

Thirty parts of metallic sodium are fused in one hundred parts of xylene in a vessel equipped with a high speed counter-rotating mechanical stirrer. The entire mixture is then agitated with the stirrer operating at about 12,000 R. P. M. while maintaining a temperature of about 115° C. After the agitation has continued for about 15 minutes two parts of activated bentonite are added to the mixture. The agitation is then continued for an additional period of about thirty minutes after which the mixture is cooled to room temperature. The resulting product is a suspension of finely divided particles of metallic sodium in xylene, the particles having an average size of about 8 microns and displaying little tendency to settle or agglomerate.

Equally good results are obtained when other alkali metals such as potassium and lithium are substituted for the sodium of the above examples. In the case of lithium dispersions somewhat higher temperatures are employed because of the higher melting point of this metal. Dispersions of rubidium and cesium are prepared in a like manner although the other alkali metals are preferred in the practice of this invention primarily because of availability.

Also, equally good results are obtained when using dispersing media other than the toluene and xylene of the above examples. For example, particularly good results are obtained using decalin or tetralin as dispersing media for metallic sodium and potassium.

Irrespective of the particular alkali metal and dispersing medium being employed, the presence of the minor amount of activated clay greatly enhances the formation and properties of the resulting dispersions. The dispersions thus prepared can be used successfully in reactions which are followed by hydrolysis steps without the danger of emulsion formation. These dispersions are characterized by the uniform particle size of the alkali metal, and also display little tendency to settle or agglomerate so as to permit storage for prolonged periods.

It is to be understood that the above working examples are given only to illustrate specific embodiments and the following claims are intended to cover all modifications within the spirit and scope of this present invention.

I claim:

1. An improved alkali metal dispersion consisting essentially of particles of an alkali metal dispersed in a liquid hydrocarbon medium inert to said alkali metal and having a boiling point above the melting point of said alkali metal, and containing from about .05 to 5 weight percent activated clay.

2. An improved sodium dispersion consisting essentially of particles of metallic sodium having an average size no greater than 10 microns dispersed in a liquid hydrocarbon medium inert to sodium and having a boiling point above the melting point of metallic sodium, and containing from about .05 to 5 weight percent activated bentonite.

3. The process for preparing an improved alkali metal dispersion which consists of agitating at a temperature above the melting point of said alkali metal fused alkali metal in a liquid hydrocarbon medium inert to said alkali metal and having a boiling point above the melting point of said alkali metal and in the presence of not more than five weight percent activated clay.

References Cited in the file of this patent

UNITED STATES PATENTS

| | | |
|---|---|---|
| 2,394,608 | Hansley | Feb. 12, 1946 |
| 2,523,204 | Feustel et al. | Sept. 19, 1950 |